United States Patent [19]

Biernat, Jr. et al.

[11] Patent Number: 5,745,210
[45] Date of Patent: Apr. 28, 1998

[54] INTEGRAL EYEWEAR FRAME

[75] Inventors: Stanley J. Biernat, Jr., Pendleton; Aaron M. Markovitz; Steven A. Skewes, both of Rochester, all of N.Y.

[73] Assignee: Bausch & Lomb Incorporated, Rochester, N.Y.

[21] Appl. No.: 872,407

[22] Filed: Jun. 10, 1997

Related U.S. Application Data

[63] Continuation of Ser. No. 848,819, Mar. 10, 1992, abandoned.

[51] Int. Cl.⁶ .................................................. G02C 1/00
[52] U.S. Cl. .................................................. 351/41; 351/83
[58] Field of Search ........................ 351/41, 114, 121, 351/113, 120, 118, 111, 83; 16/228

[56] References Cited

U.S. PATENT DOCUMENTS

| | | | |
|---|---|---|---|
| 2,746,087 | 5/1956 | Dolezal | 351/121 |
| 3,174,851 | 3/1965 | Buehler et al. | 75/170 |
| 3,351,463 | 11/1967 | Rozner et al. | 75/170 |
| 3,526,449 | 9/1970 | Bolle et al. | 351/41 |
| 3,531,190 | 9/1970 | LeBlanc | 351/113 |
| 3,558,369 | 1/1971 | Wang et al. | 148/11.5 |
| 3,672,879 | 6/1972 | Buehler | 75/170 |
| 3,756,704 | 9/1973 | Marks | 351/60 |
| 4,400,067 | 8/1983 | Joffe | 351/59 |
| 4,466,713 | 8/1984 | Tanaka | 351/106 |
| 4,472,035 | 9/1984 | Takamura et al. | 351/117 |
| 4,494,832 | 1/1985 | Takamura et al. | 351/41 |
| 4,494,833 | 1/1985 | Takamura et al. | 351/41 |
| 4,772,112 | 9/1988 | Zider et al. | 351/41 |
| 4,779,971 | 10/1988 | Lhospice et al. | 351/86 |
| 4,895,438 | 1/1990 | Zider et al. | 351/41 |
| 4,896,955 | 1/1990 | Zider et al. | 351/41 |
| 4,953,966 | 9/1990 | Segoshi et al. | 351/41 |
| 4,983,029 | 1/1991 | Sato | 351/111 |
| 5,026,151 | 6/1991 | Waltuch et al. | 351/201 |

FOREIGN PATENT DOCUMENTS

| | | |
|---|---|---|
| 0450224A3 | 10/1991 | European Pat. Off. |
| 2388293A1 | 11/1978 | France. |
| 5478885 | 6/1979 | Japan. |
| 779472 | 7/1957 | United Kingdom. |
| 871540 | 6/1961 | United Kingdom. |

*Primary Examiner*—Hung X. Dang
*Attorney, Agent, or Firm*—Katherine McGuire; John E. Thomas

[57] ABSTRACT

An eyewear frame is provided having an integral frame piece with a front portion and two temple portions positioned on opposite ends of the front portion wherein the integral frame piece is a continuous metallic wire having super-elastic properties.

4 Claims, 2 Drawing Sheets

INTEGRAL EYEWEAR FRAME

This is a continuation of application Ser. No. 07/848,819 filed on Mar. 10, 1992 now abandoned.

BACKGROUND OF THE INVENTION

1. Field of the Invention

The present invention relates to eyewear frames and, more particularly, relates to the use in eyewear frames of an integral front, hinge and temple piece composed of a wire exhibiting super-elastic properties.

1. Description of the Art

A conventional eyewear frame generally includes a pair of rims each holding a lens, a bridge for connecting the rims and a pair of temples or ear stems connected either directly or indirectly to the rims through the use of a conventional "pivotal" hinge. The hinge typically consists of two interlocking pieces, one attached to either a rim or a brow member attached to the rim and the other attached to the temple or ear stem, which are connected in a tongue and groove relationship by a conventional fastener, typically a screw.

Conventional hinges have been used since the development of the first eyewear frames for corrective lenses. While there have been many improvements to the hinge or hinge assembly mechanism, these hinges still rely substantially on the tension created by the fastener to maintain the integrity of the connection. A common problem experienced with conventional hinges is the tendency for the fastener to become loose during normal wear or to exhibit other mechanical failure resulting in movement of the entire frame on the wearer's head or total failure of the frame itself. It is a common occurrence to have the fasteners in conventional frames "tightened" by professionals in order to maintain a comfortable and secure fit of the eyewear frame on the wearer's head.

In the past, thread-locking adhesives and mechanical deformation of the fastener end (peening) have been used to help secure the fastener within the hinge assembly. However, this has not proved to be entirely satisfactory due to the additional processing steps and costs associated with these approaches. These approaches have also been found to have a limited life and often result in servicing problems due to the difficulties in adjusting the frame once the fastener has been secured.

The present invention overcomes the problems associated with conventional hinges. According to this invention, metallic wires exhibiting super-elastic properties are used as a replacement for the multipiece hinge assembly mechanism avoiding the need for fasteners and other related components. This invention also provides for an eyewear frame which connects the front portion and the temple portions in the absence of an independent hinge assembly.

Further, this invention provides an entirely new approach to eyewear frames wherein a continuous and integral frame piece is used to provide an eyewear frame having better comfort and durability then conventional frames. Moreover, the present invention exhibits better head-hold than conventional frames, is self-adjusting and is adaptable to varied head sizes without professional adjustments.

SUMMARY OF THE INVENTION

In accordance with the present invention, an eyewear frame is provided which comprises an integral frame piece having a front portion and two temple portions disposed on opposite ends of the front portion, wherein the front and temple portions are formed from a continuous, metallic wire having super-elastic properties.

The present invention also provides an eyewear frame which comprises an integral frame piece for connecting the front portion and the temple portions in the absence of an independent hinge assembly.

DETAILED DESCRIPTION OF THE INVENTION

Figure 1:
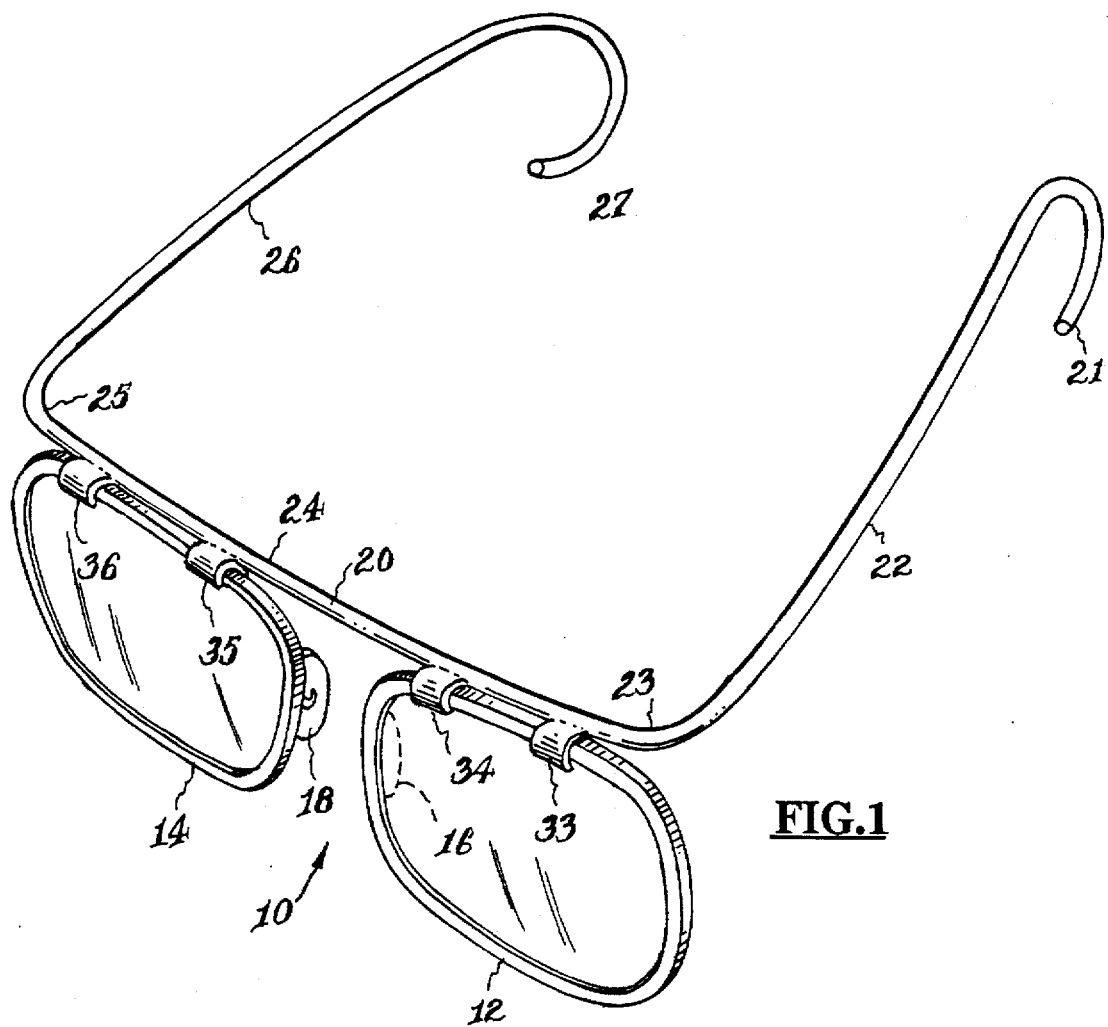
FIG. 1 is a top perspective view of an eyewear frame of one embodiment of the present invention.

Referring to FIG. 1, eyewear frame 10 is shown having two lens rims 12 and 14 (hereinafter collectively referred to as a lens assembly); nose pads 16 and 18; and integral frame piece 20. Integral frame piece 20 comprises seven zones or portions 21, 22, 23, 24, 25, 26 and 27, respectively. Zones 21 and 27 define ear portions which are shaped for placement around the wearer's ears. Optionally, the ear portions at zones 21 and 27 can be replaced with conventional ear pads (not shown) such as paddle-tips, spatula-tips and the like. Zones 22 and 26 define temple portions which are intended to extend along the side of the wearer's head. Zone 24 defines a front brow portion and extends across the forehead of the wearer and is the portion to which the front assembly is affixed.

Integral frame piece 20 has hinge portions at zones 23 and 25 which provide the hinge function of the present invention. Zones 23 and 25 replace conventional hinge assembly mechanisms which would normally be found in this location on conventional frames.

Two lenses are contained within rims 12 and 14. Alternatively, the lenses can be attached directly to the integral frame piece 20 through conventional means such as screws, pins or the like. It should also be noted that the eyewear frame 10 may optionally contain a bridge (not shown) between rims 12 and 14. Further, the two lenses held within rims 12 and 14 can be replaced with a single unitary lens which can be attached to integral frame piece 20 with or without the use of a rim. Referring again to FIG. 1, rims 12 and 14 are attached to integral frame piece 20 by attachments 33, 34, 35 and 36 which are affixed to the wire by any conventional means such as brazing, welding, adhesives, mechanical joining and the like. Other points of attachments to the integral frame piece 20 can be substituted.

The metallic wire used herein can be any metal alloy exhibiting super-elastic properties. Many metal alloys, especially the nickel-titanium alloys (known under the name NITINOL), are well known for their super-elastic properties and are useful herein. U.S. Pat. Nos. 3,174,851; 3,672,879; 3,558,369 and 3,351,463 disclose such materials and are incorporated herein by reference. These alloys are also known as shape memory alloys although the properties vary depending on whether the super-elastic or shape memory characteristics are desired. The mechanical properties of these alloys are dependent on the alloy composition and on the processing techniques, particularly on the heat treatments, used in forming and working the alloys.

Various alloys have been known to provide super-elastic (also sometimes referred to as pseudo-elastic) properties. The alloys of the present invention are generally alloys containing, as the principle constituents, nickel and titanium. However, not all such alloys need to contain these metals. Examples of suitable alloys (identified by their elemental symbols) known to exhibit super-elastic properties include Au—Cd, In—Tl, Ti—Ni, Cu—Zn, Cu—Al—Ni, Cu—Zn—Sn, Ag—Cd, Au—Cu—Zn, and the like. Preferred are the nickel-containing alloys and more preferred are the nickel-titanium-containing alloys which contain from about 49% to about 52 atomic % of nickel, about 51% to about 48 atomic % titanium and, optionally, from 0.01% to about 5 atomic % of copper, chromium, cobalt, or vanadium. The 99.9% by weight pure titanium-nickel alloys are the most preferred alloys.

As mentioned above, it is important that the wire employed in the present invention have super-elastic properties which provide the desired degree of tension which assures suitable contact pressure on the wearer's head. The wire chosen typically exhibits constant tension to wearer's head allowing the integral frame piece 20 in the frame to self-adjust with respect to the proper degree of tension exerted against the wearer's head. Further, to ensure dimensional stability, the wire should be highly resistant to change at various environmental temperatures.

As used herein, a metal alloy exhibiting super-elastic properties is a material which when stressed (in order to deform well past its apparent yield point) is able to fully recover to its initial prestressed shape upon removal of the stress. This phenomena is a result of the formation of a stress assisted martensitic phase during loading. This stress induced martensitic phase is unstable except under the application of stress and therefore reverts back to the matrix phase upon removal of the stress. The material is super-elastic in the temperature range between the austenite finish temperature and the martensite deformation temperature. Further, these materials are known to exhibit immediate strain recovery upon unstressing and are able to withstand greater than 7% strain prior to fracture or plastic deformation.

As used herein, a shape memory alloy is defined as a material which is formed into a shape while at a temperature significantly above the austenite finish temperature. Upon cooling, the material possesses a metastable martensitic matrix phase. When stress is applied to the material, the martensitic matrix phase will form a stress induced martensitic phase. When the applied stress is removed, the stress induced martensitic phase will not revert back to the matrix phase due to the fact that it is metastable. However, upon heating to a suitable temperature (between the austenite start temperature and the austenite finish temperature), the stress induced martensitic phase becomes unstable and reverts back to the matrix phase resulting in the material recovering to its prestressed dimensions.

When the selected metal alloys are subjected to various processing parameters, including work-hardening and heat treatment, the proper stress-strain curves can be obtained which result in the various previously described zones of eyewear frame 10 having optimized properties. As is apparent to those skilled in the art, the specific properties desired and the temperature range at which the properties are observed can be controlled to meet specific needs of the application based on the metal alloys and the specific processing techniques employed. For example, a frame directed for wear during sporting activities would have a high degree of tension to maintain the frame on the wearer's head during physical activity.

Further, the present invention provides a continuous integral frame piece 20 wherein the zones identified above may exhibit different or varying flexibilities or physical properties. For example, zones 23 and 25 can be selected and processed to exhibit certain physical characteristics to achieve the desired tension. Yet, zone 24 can be processed to provide additional integrity to the lens assembly. Further, zones 21 and 27 can be processed to exhibit a high degree of flexibility so as to comfortably and partially fit around the ears of the wearer. In a preferred embodiment, the ear portions at zones 21 and 27 will exhibit shape memory characteristics to function similar to a cable temple used in conventional eyewear.

While, the front brow portion at zone 24 is generally continuous, in certain applications, it can include a joining of two separate wires having continuous zones 21, 22 and 23 and 25, 26 and 27, respectively. Any frame which includes the joining of two wires at zone 24 is contemplated as an substantially equivalent embodiment to the present invention provided that zones 23 and 25 are continuously and integrally connected to zones 24, 22 and 26 in the absence of an independent hinge assembly. The joining can be through any of the conventional techniques known in the art. The connection in zone 24 can be for functional reasons, for cosmetic reasons, or for manufacturing reasons.

It must be noted that the cross-sectional shape of any portion of the integral frame piece 20, need not be limited to round. The cross-sectional shape is only limited by the manufacturing process employed. Examples of other shapes include flat, oval, rectangular and the like. Further, integral frame piece 20 may incorporate a variety of cross-sectional shapes areas at its definable zones. For example, the brow portion at zone 24 may be round while the hinge portions at zones 23 and 25 may be flat.

Generally, the use of the integral frame piece 20 as disclosed herein will result in the temple portions at zones 22 and 26 being in a first position (rest position) which is the position at which the temple portions will be found at rest or, in other words, the position when no force is exerted on the temple portions. In order to move the temple portions at zones 22 and 26 into a second position, which may be a normal wearing position on the wearer's head or a storage position such as in a storage case, force must be exerted on temple portions at zones 22 and 26. It should be noted that the tension exhibited on integral frame piece 20 is distributed throughout zones 22 through 26 unlike conventional frames. Accordingly, the characteristics of the wire at these zones are closely controlled in order to achieve optimal overall tension and comfort.

Figure 3:
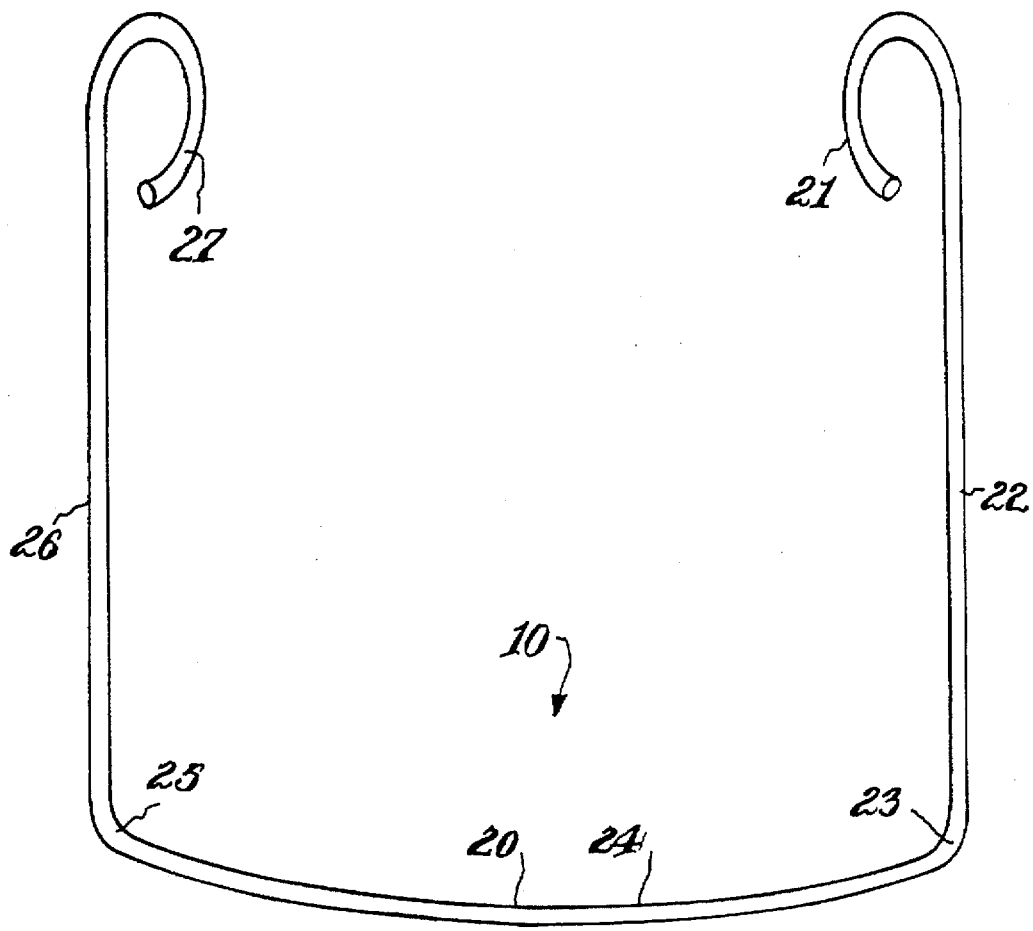
FIG. 3 is a schematic view similar to FIG. 2 showing the temple portions in a second position.
Figure 2:
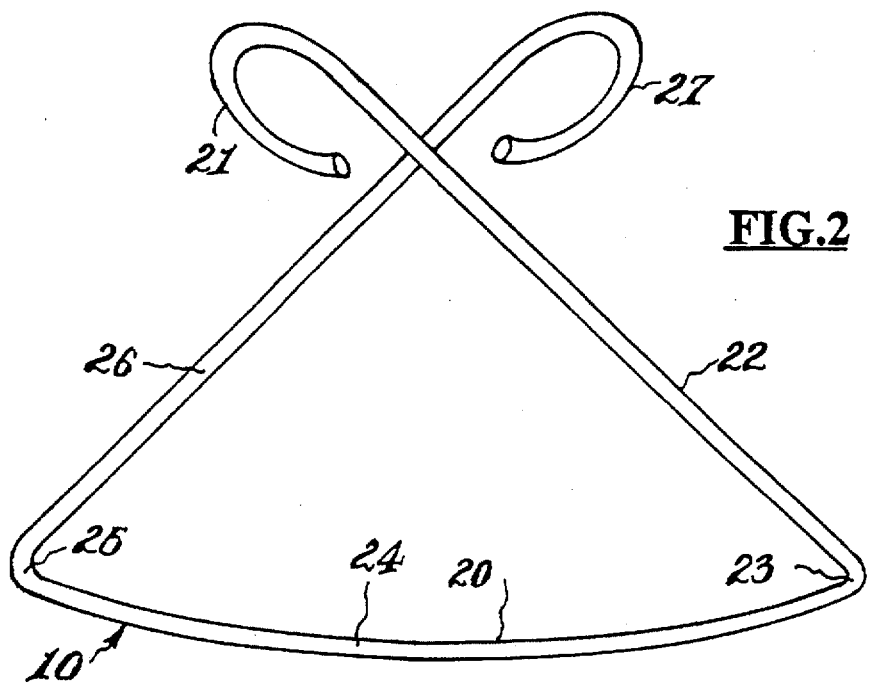
FIG. 2 is a schematic view of the integral frame piece of the eyewear frame shown in FIG. 1 showing the temple portions in a rest position.

In one embodiment of the present invention, shown in FIG. 2, the wire is shaped so that a first position (rest position) of the temple portions at zones 22 and 26 is from about 30 degrees to about 60 degrees relative to the lens assembly (rims 12 and 14). In order to move the temple portions at zones 22 and 26 to a second position (normal wearing position), as shown in FIG. 3, of between about 80 degrees to about 100 degrees relative to the lens assembly, about 15 grams to about 200 grams of force (0.15 to 2.0 newtons) would be exerted on the temple portions at zones 22 and 26. More preferably, the force required to open the temple portions at zones 22 and 26 from a rest position of about 45 degrees to a wearing position of about 90 degrees is about 30 grams to about 60 grams of force (0.3 to 0.6 newtons).

Figure 4:
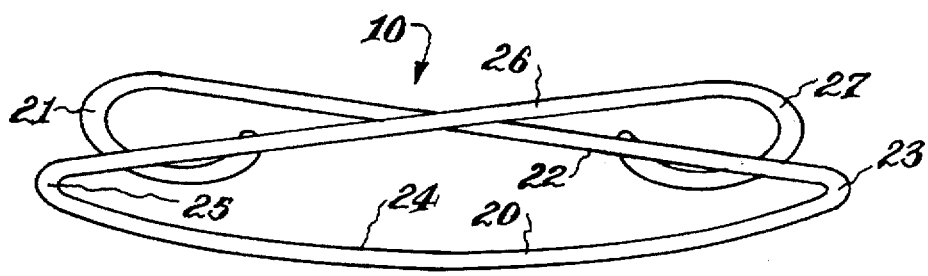
FIG. 4 is a schematic view similar to FIG. 2 showing the temple portions in a different second position.

In another embodiment of the present invention, shown in FIG. 4., the rest position of the temple portions at zones 22 and 26 could be in the closed position or about 5 degrees to about 15 degrees relative to the lens assembly. As is clear to those skilled in the art, various rest positions can be selected.

It is also preferred that the materials employed in the present invention be extremely flexible and resistant to fatigue providing the user with at least 100,000 cycles from the first or rest position to the second position without failure.

The initial step of final frame production is the production of the raw material. Once the raw material is produced in wire form (either round or any other desired shape), a grinding operation is employed to improve the surface finish by removal of the oxide layer formed (i.e. in NITINOL, $TiO_2$) and provide the initial step in final wire shape dimensions.

In order to better illustrate the present invention, the following example for the production of an eyewear frame made from a nickel-titanium metal alloy is provided.

The metal alloy preparation process involves several steps. Initially, a wire is produced with the desired diameter and shape. The wire is then ground to improve the surface finish (remove oxide) and to initiate final shape processing. Following grinding, the wire is annealed at a suitable temperature, typically between 400° and 800° C., for a sufficient time period to produce an annealed structure, typically about 0.1 hour to about 10.0 hours. The wire is now swaged and pressed by any combination of swaging and pressing steps to obtain desired shape and physical characteristics as is well known in the art. Swaging is the preferred method of producing zones 23 and 25. These operations typically produce a wire having from 10% to 60% work hardening. A final heat treatment is now employed in order to obtain the final desired elasticity. Preferably, this heat treatment is a low temperature annealing operation (i.e. 400° to 600° C.) and is performed in either an atmosphere or vacuum furnace to reduce the oxide build up. Following the heat treatment, a final grinding/polishing operation is employed in order to remove any oxide and/or prepare the frame for a final finishing operation. During the finishing operation and prior to application of decorative coating, decorative insignia or design may be applied to the integral frame (i.e. by laser engraving). The final finishing operation may include electroplating, vacuum coating, and the like or a combination of both electroplating and vacuum coating. Electroplating may be accomplished by using known techniques. An alternative final finish may be applied by the use of a vacuum coated material. Examples of vacuum deposited materials include, but are not limited to, titanium nitride, titanium carbonitride and zirconium nitride. Of these coatings, the titanium nitride coating is preferred. With the use of a titanium nitride coating, various colors may be produced by changing the process parameters as is generally know to those skilled in the art.

Referring FIG. 1, rims 12 and 14 are attached after finishing or final finishing depending upon the attachment method used. For example, if low temperature brazing or adhesives are chosen for the attachment method, rims 12 and 14 should be attached after final finishing. However, if a high temperature operation, such as welding, or high temperature brazing or a mechanical method, is employed, the rims 12 and 14 may be attached prior to the final finishing operation.

Although only a few embodiments of the present invention have been specifically described above, it should be appreciated that many additions and modifications can be made without departing from the spirit and scope of this invention. Further, it is understood that the subject invention is not limited by the example or embodiments set forth above, but shall include modifications and variations that fall within the scope of the attached claims.

What is claimed:

1. A unitary eyewear frame having first and second temple portions and a front brow portion extending between said first and second temple portions, said first and second temple portions and said front brow portion comprised of a unitary length of super-elastic material, said unitary length of super-elastic material forming and defining first and second bendable hinge areas between said front brow portion and said first and second temple portions, respectively, absent an independent hinge assembly, whereby said first and second temple portions are movable about said first and second bendable hinge areas from a first, closed position which is from about 5 to 15 degrees relative to said front brow portion to a second wearing position which is from about 80 to 100 degrees relative to said front brow portion.

2. The eyewear frame of claim 1 wherein said superlastic material is a metal alloy containing from about 49 atomic % to about 52 atomic % of nickel.

3. The eyewear frame of claim 2 wherein said superelastic material further contains titanium.

4. The eyewear frame of claim 1 wherein said material is an alloy selected from Au—Cd, In—Tl, Ti—Ni, Cu—Zn, Cu—Al—Ni, Cu—Zn—Sn, Ag—Cd, and Au—Cu—Zn.

* * * * *